United States Patent
Kaji

(10) Patent No.: US 10,442,249 B2
(45) Date of Patent: Oct. 15, 2019

(54) PNEUMATIC TIRE

(71) Applicant: TOYO TIRE & RUBBER CO., LTD., Osaka-shi, Osaka (JP)

(72) Inventor: Shinichi Kaji, Osaka (JP)

(73) Assignee: TOYO TIRE CORPORATION, Itami-shi (JP)

( * ) Notice: Subject to any disclaimer, the term of this patent is extended or adjusted under 35 U.S.C. 154(b) by 581 days.

(21) Appl. No.: 14/949,071

(22) Filed: Nov. 23, 2015

(65) Prior Publication Data
US 2016/0159160 A1    Jun. 9, 2016

(30) Foreign Application Priority Data

Dec. 3, 2014   (JP) .................. 2014-245058

(51) Int. Cl.
  *B60C 11/13*   (2006.01)
  *B60C 11/03*   (2006.01)
  *B60C 11/11*   (2006.01)
(52) U.S. Cl.
  CPC ...... *B60C 11/0309* (2013.01); *B60C 11/1307* (2013.01); *B60C 11/0306* (2013.01); *B60C 11/11* (2013.01); *B60C 2011/1338* (2013.01)
(58) Field of Classification Search
  CPC .................... B60C 11/1307; B60C 2011/1338
  See application file for complete search history.

(56) References Cited

U.S. PATENT DOCUMENTS

2014/0360641 A1* 12/2014 Jacobs ................ B60C 11/1307
                                                        152/209.21

FOREIGN PATENT DOCUMENTS

| JP | 3-86605 A | | 4/1991 |
|---|---|---|---|
| JP | 06-191231 A | * | 7/1994 |
| JP | 11-151912 A | | 6/1999 |
| JP | 2006-137231 A | | 6/2006 |
| JP | 2007-030718 A | * | 2/2007 |
| JP | 2007-290628 A | * | 11/2007 |
| JP | 2010-30596 A | | 2/2010 |
| JP | 2013-169887 A | * | 9/2013 |
| JP | 2013-169887 A | | 9/2013 |

OTHER PUBLICATIONS

Machine translation for Japan 2013-169887 (Year: 2018).*
Machine translation for Japan 2007-290628 (Year: 2018).*

(Continued)

*Primary Examiner* — Steven D Maki
(74) *Attorney, Agent, or Firm* — Westerman, Hattori, Daniels & Adrian, LLP

(57) ABSTRACT

A pneumatic tire includes: a tread portion; grooves formed on the tread portion; and land portions defined by the grooves, wherein each of the land portions includes: a pair of side walls which opposedly face each other with the groove sandwiched therebetween; a first projecting ridge formed on one of the pair of side walls; and a second projecting ridge formed on the other side wall, the first projecting ridge and the second projecting ridge extend along the groove, at least one of the first projecting ridge and the second projecting ridge is inclined such that a position of the projecting ridge in a groove depth direction changes along the groove, and the first projecting ridge intersects with the second projecting ridge as viewed in a width direction of the groove.

7 Claims, 20 Drawing Sheets

(56) References Cited

OTHER PUBLICATIONS

Machine translation for Japan 2007-030718 (Year: 2018).*
Machine translation for Japan 06-191231 (Year: 2018).*
Office Action dated Jan. 5, 2017, issued in counterpart Chienese Patent Application No. 201510868062.9, with machine translation. (8 pages).
Office Action dated Apr. 24, 2018, issued in counterpart Japanese Application No. 2014-245058, with English machine translation. (6 pages).

* cited by examiner

PNEUMATIC TIRE

BACKGROUND OF THE INVENTION

Field of the Invention

The present invention relates to a pneumatic tire.

Description of the Related Art

With respect to pneumatic tires, there has been known a pneumatic tire provided with land portions defined by grooves formed on a surface of a tread. In such a pneumatic tire provided with such land portions, there may be a case where the land portion falls down due to a stress in a longitudinal direction or a lateral direction generated at the time of traveling or turning of a vehicle thus giving rise to uneven wear where the land portion locally wears.

In view of the above, in JP-A-2006-137231, to prevent a land portion defined by grooves from falling down, there has been proposed an idea of forming a plurality of projections on a side wall of the groove extending in a tire circumferential direction. However, in this literature, the projection is formed of a columnar portion projecting in a groove width direction and hence, rigidity of the projection is low whereby the falling-down land portion cannot be supported by the projections. Accordingly, there may be a case where uneven wear cannot be sufficiently suppressed.

In JP-A-3-86605, to efficiently drain water in the inside of a tire ground contact surface toward the outside of the ground contact surface at the time of high speed traveling, there has been proposed an idea where an inclined circumferential fin is formed on a side wall of a land portion defined by circumferential grooves and lateral grooves which faces the circumferential groove such that the circumferential fin projects from the side wall of the land portion from a position of a step-in side end portion of the land portion close to a tread surface to a position of a kick-out side end portion of the land portion close to a groove bottom of the circumferential groove. In JP-A-3-86605, if the circumferential fins formed on a pair of side walls which oppositely face each other with the circumferential groove sandwiched therebetween were brought into contact with each other, falling down of the land portion could be suppressed. However, the circumferential fins formed on the pair of side walls are inclined in the same direction and are arranged parallel to each other and hence, when the land portion falls down, one circumferential fin is sometimes positionally displaced upward or downward from the other circumferential fin whereby the circumferential fins are not brought into contact with each other thus giving rise to a case where falling down of the land portion cannot be suppressed until the circumferential fin is brought into contact with the side wall which oppositely faces the circumferential fin.

In JP-A-2010-30596, to improve the grounding property of a tire by realizing the uniform distribution of ground contact pressure of a land portion defined by main grooves extending in a tire circumferential direction and lateral grooves intersecting with main grooves, there has been proposed an idea of forming a projecting ridge which projects from a side surface of the land portion and continuously extends over the whole circumference of the side surface and forming the projecting ridge into a zigzag shape or a wave form having amplitude in a height direction of the land portion. However, the arrangement between the projecting ridge and a projecting ridge which is formed on an oppositely facing side wall with the main groove sandwiched therebetween is not taken into consideration. Accordingly, there may be a case where the projecting ridge is not brought into contact with the projecting ridge formed on the oppositely facing side wall so that falling down of the land portion cannot be suppressed until the projecting ridge is brought into contact with the side wall.

SUMMARY OF THE INVENTION

The invention has been made in view of such drawbacks, and it is an object of the invention to provide a pneumatic tire where the occurrence of uneven wear of a land portion can be suppressed by suppressing excessive falling down of the land portion.

According to one aspect of the invention, there is provided a pneumatic tire which includes: a tread portion; grooves formed on the tread portion; and land portions defined by the grooves, wherein each of the land portions includes: a pair of side walls which oppositely face each other with the groove sandwiched therebetween; a first projecting ridge formed on one of the pair of side walls; and a second projecting ridge formed on the other side wall, the first projecting ridge and the second projecting ridge extend along the groove, at least one of the first projecting ridge and the second projecting ridge is inclined such that a position of the projecting ridge in a groove depth direction changes along the groove, and the first projecting ridge intersects with the second projecting ridge as viewed in a width direction of the groove.

To describe preferred modes of the pneumatic tire according to the invention, the second projecting ridge may be inclined in a reverse direction of an inclination direction of the first projecting ridge. The land portion may be a block defined by the main grooves extending in a tire circumferential direction and the lateral grooves arranged at intervals in the tire circumferential direction. In this case, the first projecting ridge and the second projecting ridge may be formed on the side walls which define the lateral groove. At least one of the first projecting ridge and the second projecting ridge may be formed in plurality on the side wall and arranged at intervals in a groove depth direction.

According to the invention, when the land portion falls down, the projecting ridges are surely brought into contact with each other before the projecting ridge is brought into contact with the oppositely facing side wall of the land portion and hence, the excessive falling down of the land portion can be prevented thus suppressing uneven wear of the land portion.

DETAILED DESCRIPTION OF THE INVENTION

Figure 1:
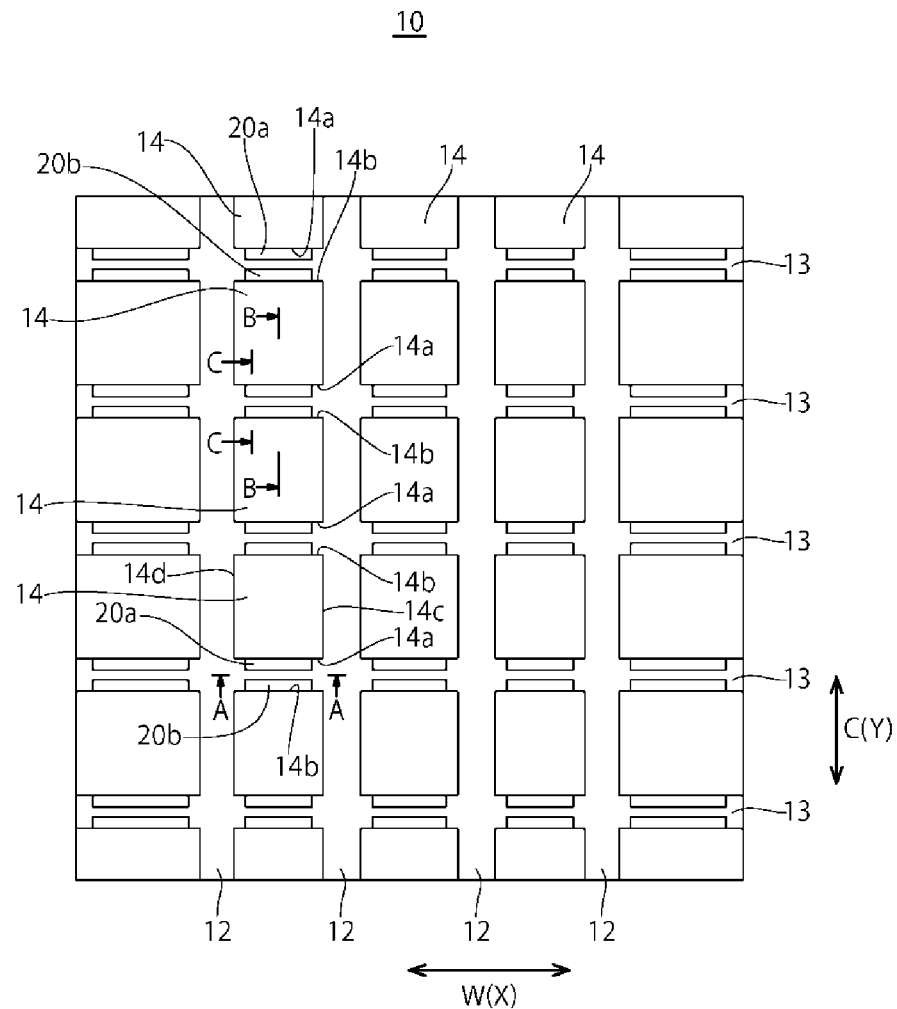
FIG. 1 is a plan view showing a tread pattern of a pneumatic tire according to one embodiment of the invention.

Hereinafter, one embodiment of the invention is explained with reference to drawings.

Although not shown in the drawing, a pneumatic tire according to this embodiment is constituted of: a pair of left and right bead portions; a pair of left and right side wall portions; and a tread portion 10 which is disposed between the left and right side wall portions so as to connect radially outer end portions of the left and right side wall portions to each other. The pneumatic tire includes a carcass which extends across between the pair of bead portions.

The carcass is formed of at least one carcass ply which extends from the tread portion 10, passes through the side wall portions, and has both end portions thereof engaged with bead cores embedded in the bead portions respectively thus reinforcing the above-mentioned respective portions.

On an outer peripheral side of the carcass at the tread portion 10, a belt formed of two or more steel coat layers coated by rubber is mounted thus reinforcing the tread portion 10 on the outer circumferential side of the carcass. In the pneumatic tire, as shown in FIG. 1, a plurality of grooves 12, 13, and a plurality of land portions 14 which are defined by these grooves 12, 13 are formed on a surface of the tread portion 10 which forms a ground contact surface 11.

In this embodiment, four circumferential grooves 12 which extend in a tire circumferential direction C, a plurality of lateral grooves 13 which are formed at intervals in the tire circumferential direction and extend in the tire width direction W, and the block-shaped land portions 14 which are defined by the circumferential grooves 12 and the lateral grooves 13 are formed on the tread portion 10. In this embodiment, the explanation is made with respect to the case where the circumferential grooves 12 are formed linearly, and the lateral grooves 13 are formed perpendicular to the circumferential grooves 12. However, by forming the circumferential grooves 12 in a zigzag manner, or by forming the lateral grooves 13 in an inclined manner with respect to the circumferential grooves 12, the shape of the land portion 14 in a planar view may be formed into a parallelogram shape, a triangular shape, a trapezoidal shape or the like.

With respect to the land portions 14, projecting ridges 20a, 20b which project to the inside of the lateral groove 13 are formed on a pair of side walls 14a, 14b which faces each other in an opposed manner with the lateral groove 13 sandwiched therebetween along a direction X in which the lateral groove 13 extends (in this embodiment, the direction X being equal to a tire width direction W).

The projecting ridges 20a, 20b formed on the pair of side walls 14a, 14b which faces each other in an opposed manner with the lateral groove 13 sandwiched therebetween have a rectangular shape having rounded corners in cross section respectively. The projecting ridges 20a, 20b are inclined such that the position of the projecting ridge in a groove depth direction H changes along the lateral groove 13 (see FIG. 2 to FIG. 5). In FIG. 3, a long-dashed double-short dashed line indicates a state where the projecting ridge 20b formed on the side wall 14b of the land portion 14 which faces the projecting ridge 20a in an opposed manner with the lateral groove 13 sandwiched therebetween is projected on the side wall 14a in the width direction Y of the lateral groove 13 (in this embodiment, the direction Y being equal to the tire circumferential direction C).

In this embodiment, the projecting ridge 20a is inclined so that the more the projecting ridge 20a formed on one side wall 14a extends toward one side X1 along the direction in which the lateral groove 13 extends, the more it approaches a groove bottom 13a. On the other hand, the projecting ridge 20b is inclined so that the more the projecting ridge 20b formed on the other side wall 14b which faces one side wall 14a in an opposed manner extends toward the other side X2 along the direction in which the lateral groove 13 extends, the more it approaches a groove bottom 13a. In this case, the projecting ridge 20b formed on the other side wall 14b is inclined in a reverse direction of the inclination direction of the projecting ridge 20a formed on one side wall 14a. Due to such a constitution, the projecting ridges 20a, 20b formed on the pair of side walls 14a, 14b are arranged such that the projecting ridges 20a, 20b intersect with each other at a center portion of the land portions 14 in the direction X in which the lateral groove 13 extends as viewed in the width direction Y of the lateral groove 13 (see FIG. 4).

Although the positions where the projecting ridges 20a, 20b are formed in the depth direction H of the lateral groove 13 can be arbitrarily set, it is preferable to set the positions of the projecting ridges 20a, 20b as follows. An end portion of the projecting ridge 20a, 20b which approaches the groove bottom 13a is arranged on the ground contact surface 11 side of a position which corresponds to 40% of depth h of the lateral groove 13 measured from the groove bottom 13a. An end portion of the projecting ridge 20a, 20b which approaches the ground contact surface 11 is arranged on the groove bottom 13a side of a position which corresponds to 90% of depth h of the lateral groove 13 measured from the groove bottom 13a. An intersection where the projecting ridges 20a, 20b intersect with each other is arranged on the ground contact surface 11 side of a position which corresponds to 50% of the depth h of the lateral groove 13 measured from the groove bottom 13a.

In the pneumatic tire having the above-mentioned configuration according to this embodiment, the pair of projecting ridges 20a, 20b which are formed on the pair of side walls 14a, 14b opposedly facing each other with the lateral groove 13 sandwiched therebetween are inclined such that the position of each projecting ridge in the groove depth direction H changes along the lateral groove 13, and the pair of projecting ridges 20a, 20b is arranged such that the projecting ridges 20a, 20b intersect with each other as viewed in the width direction Y of the lateral groove 13. Due to such a configuration, when the land portion 14 falls down toward the inside of the lateral groove 13, before the projecting ridges 20a, 20b are brought into contact with the side walls 14b, 14a of the land portions 14 which face each other in an opposed manner, the projecting ridges 20a, 20b are surely brought into contact with each other. Accordingly, it is possible to prevent the excessive falling down of the land portions 14 thus suppressing the occurrence of uneven wear of the land portions 14.

In this embodiment, the projecting ridges 20a, 20b are formed on both of the pair of side walls 14a, 14b which face each other in an opposed manner with the lateral groove 13 sandwiched therebetween and hence, compared to a case where a projecting ridge is formed only on one side wall, it is possible to reduce projecting amounts of the projecting ridges 20a, 20b. Accordingly, when the projecting ridges 20a, 20b are brought into contact with each other, the projecting ridges 20a, 20b are minimally deformed so that the projecting ridges 20a, 20b can surely support the falling land portions 14.

The projecting ridges 20a, 20b formed on the side walls 14a, 14b are inclined such that the position of the projecting ridge in the groove depth direction H changes along the direction X in which the lateral groove 13 extends. Accordingly, even when a portion of the projecting ridge 20a, 20b is exposed to the ground contact surface 11 due to wear of the land portion 14, there is no possibility that the whole projecting ridge 20a, 20b is exposed to the ground contact surface 11 in the longitudinal direction of the projecting ridge 20a, 20b (in the direction X in which the lateral groove 13 extends). Accordingly, an area where the lateral groove 13 is clogged by the projecting ridges 20a, 20b can be reduced and hence, the lowering of drainage performance of the lateral groove 13 caused by the projecting ridges 20a, 20b can be suppressed.

In this embodiment, the intersection where the projecting ridges 20a, 20b intersect with each other is arranged on the ground contact surface 11 side of the position which corresponds to 50% of the depth h of the lateral groove 13 measured from the groove bottom 13a. Accordingly, when the land portion 14 falls down toward the inside of the lateral groove 13, the projecting ridges 20a, 20b are brought into contact with each other at an early stage of the falling and hence, the falling of the land portion 14 can be suppressed more effectively.

Modification 1

Figure 4:
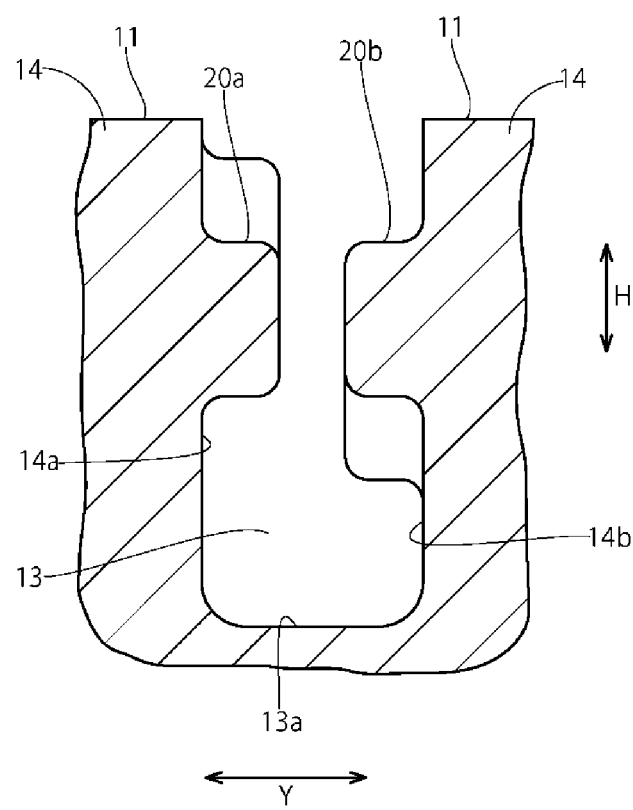
FIG. 4 is a cross-sectional view taken along a line B-B in FIG. 1.
Figure 5:
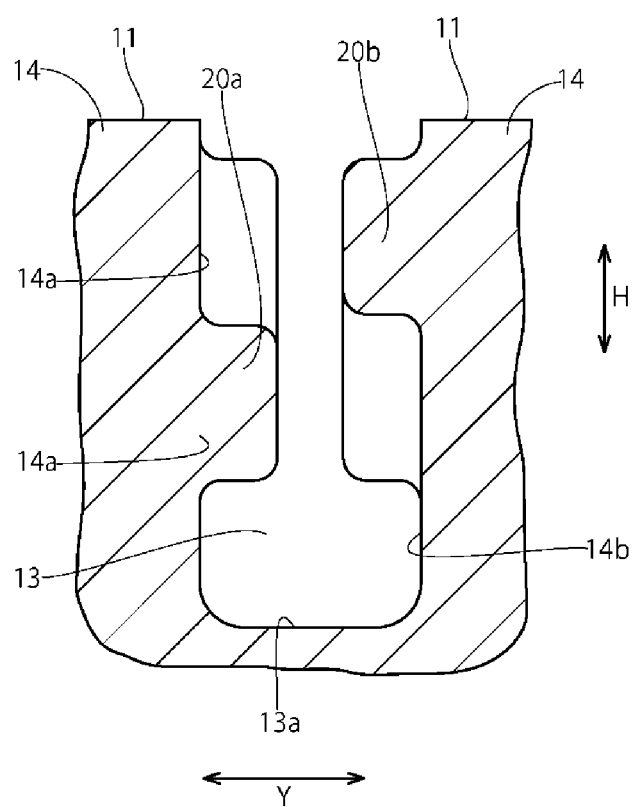
FIG. 5 is a cross-sectional view taken along a line C-C in FIG. 1.
Figure 6:
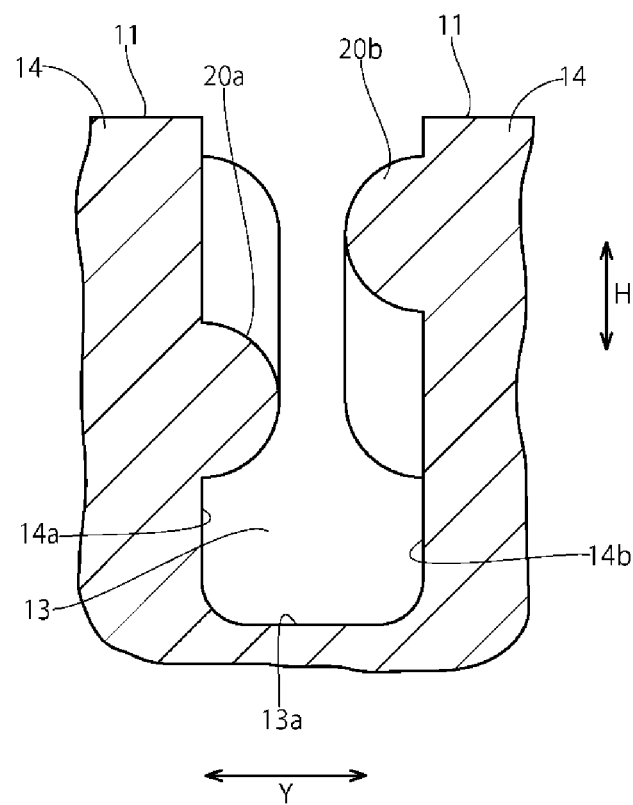
FIG. 6 is a cross-sectional view of a land portion according to a modification 1 of the invention.
Figure 7:
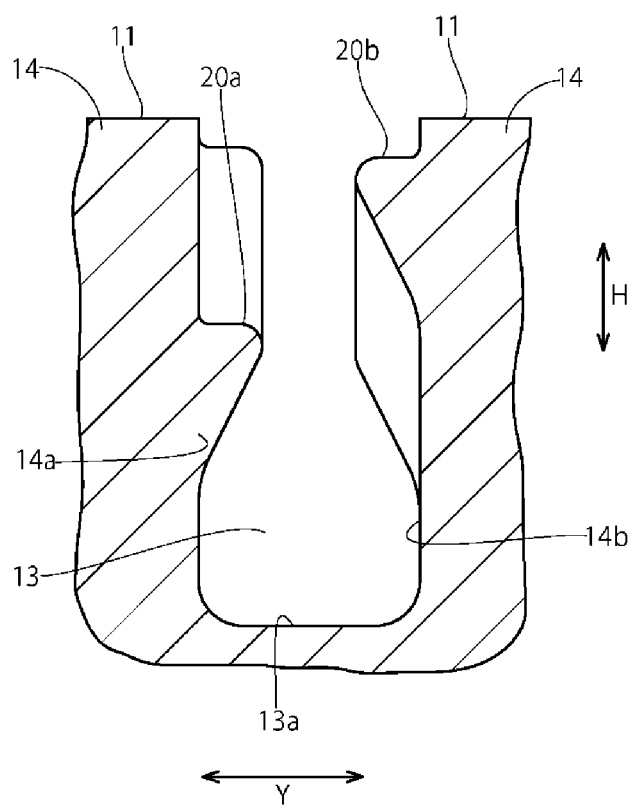
FIG. 7 is a cross-sectional view of the land portion according to the modification 1 of the invention.

In the above-mentioned embodiment, the projecting ridges 20a, 20b are formed into a rectangular shape having rounded corners in cross section as shown in FIG. 4 and FIG. 5. However, a cross-sectional shape of the projecting ridges 20a, 20b is not particularly limited, and may be a semicircular shape shown in FIG. 6, a triangular shape having rounded corners shown in FIG. 7 or the like. For example, as shown in FIG. 7, when a cross-sectional shape of the projecting ridges 20a, 20b is a triangular shape having: a surface which is perpendicular to the side wall 14a, 14b and is arranged on a ground contact surface 11 side; and an inclined surface which is inclined such that a projecting amount of the inclined surface from the side wall 14a, 14b is gradually decreased as the inclined surface approaches the groove bottom 13a and is arranged on a groove bottom 13 side. With such a configuration, at the time of removing a building mold for molding a pneumatic tire, the building mold is minimally caught by the projecting ridges 20a, 20b and hence, the projecting ridges 20a, 20b are minimally broken. Accordingly, it is preferable to form the projecting ridges 20a, 20b into such a triangular shape in cross section.

Modification 2

Figure 8:
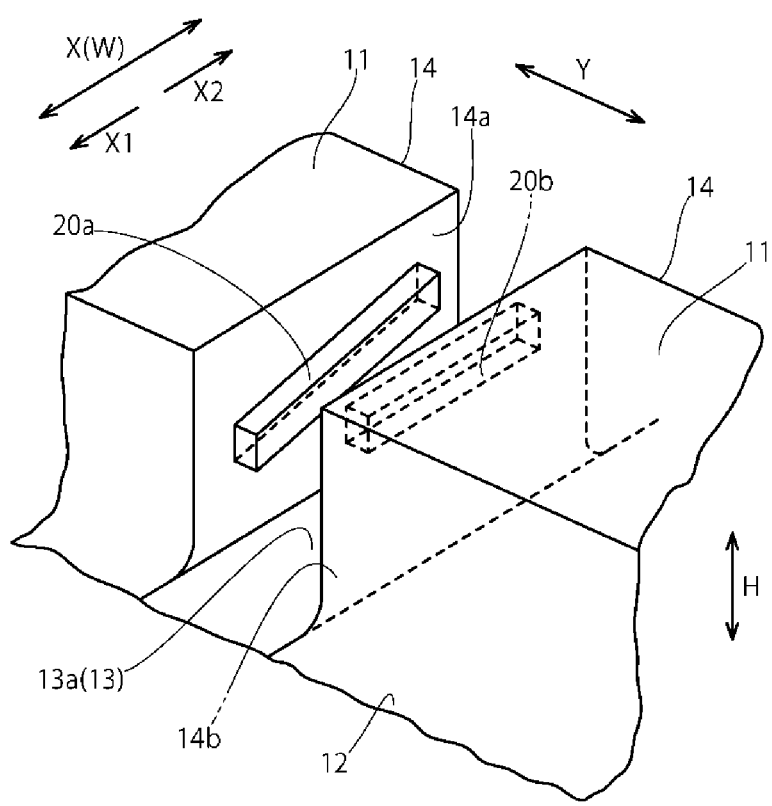
FIG. 8 is a perspective view of a land portion according to a modification 2 of the invention.
Figure 9:
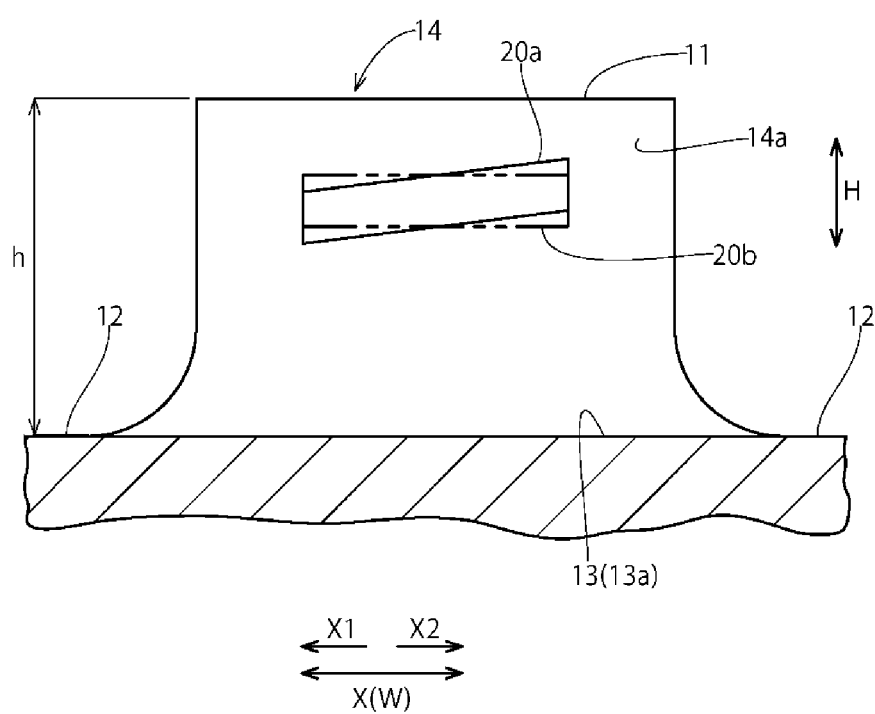
FIG. 9 is a cross-sectional view of the land portion according to the modification 2 of the invention.

In the above-mentioned embodiment, the explanation has been made with respect to the case where both of the projecting ridges 20a, 20b are formed in an inclined manner such that the position of the projecting ridge in the groove depth direction H changes along the direction X in which the lateral groove 13 extends. However, it is sufficient that at least one projecting ridge (for example, the projecting ridge 20a) is formed in an inclined manner and one projecting ridge (the projecting ridge 20a) and the other projecting ridge (for example, the projecting ridge 20b) intersect with each other as viewed in the width direction Y of the lateral groove 13. For example, as shown in FIG. 8 and FIG. 9, one projecting ridge (projecting ridge 20a) may be formed in an inclined manner, and the other projecting ridge (projecting ridge 20b) may be formed parallel to the groove bottom 13a. Also with such a configuration, before the projecting ridges 20a, 20b are brought into contact with the side walls 14a, 14b of the land portions 14 which face each other in an opposed manner, the projecting ridges 20a, 20b are surely brought into contact with each other and hence, the excessive falling of the land portions 14 can be suppressed thus suppressing the occurrence of uneven wear of the land portions 14.

Modification 3

Figure 2:
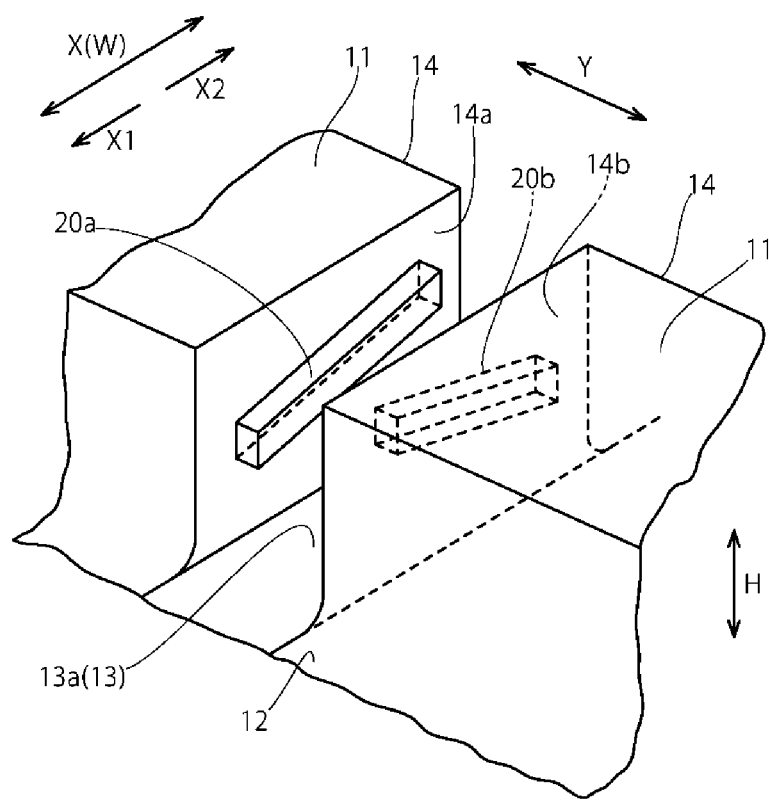
FIG. 2 is a perspective view of land portions of the pneumatic tire shown in FIG. 1.
Figure 3:
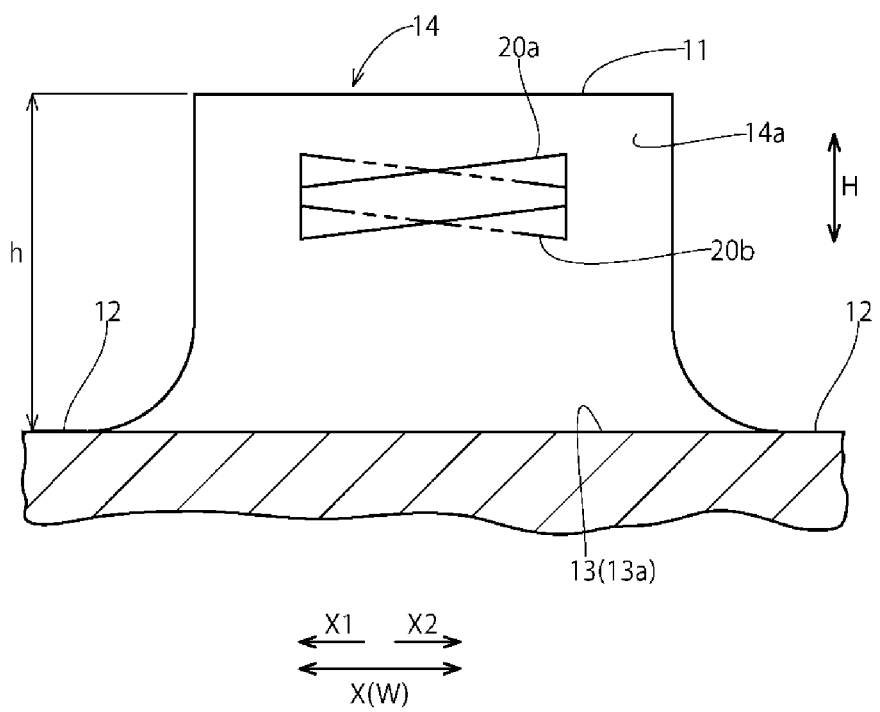
FIG. 3 is a cross-sectional view taken along a line A-A in FIG. 1.
Figure 10:
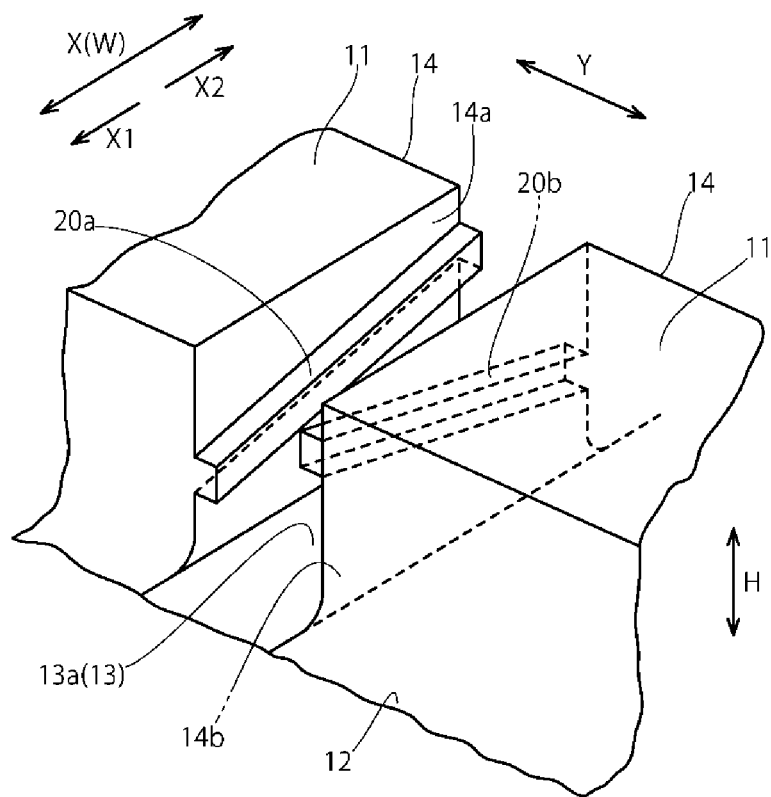
FIG. 10 is a perspective view of a land portion according to a modification 3 of the invention.
Figure 11:
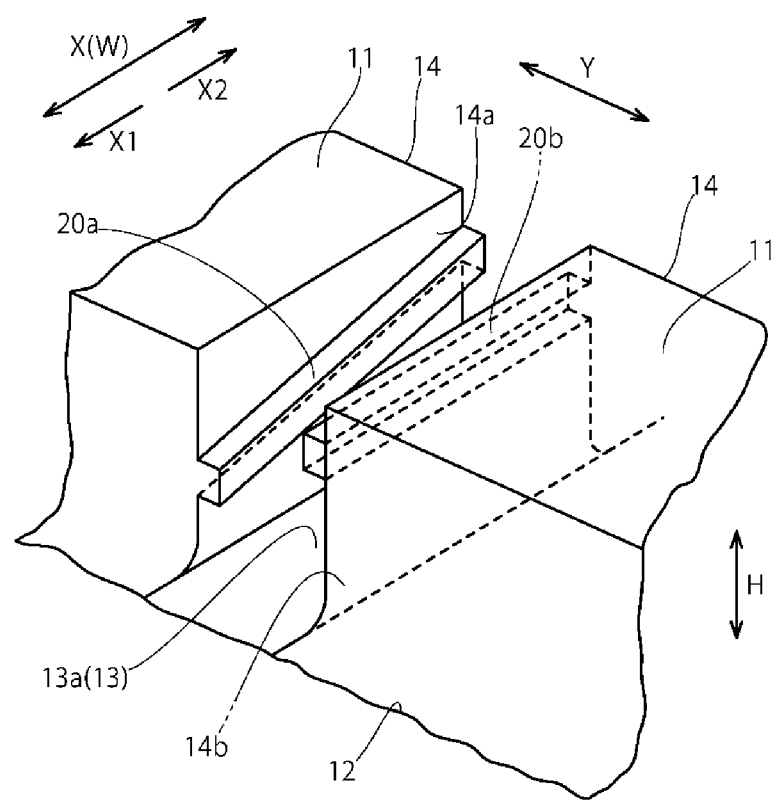
FIG. 11 is a perspective view of the land portion according to the modification 3 of the invention.

In the above-mentioned embodiment, as shown FIG. 2 and FIG. 3, the end portions of the projecting ridge 20a, 20b in the direction X in which the lateral groove 13 extends are positioned inside the edge portions of the land portion 14 respectively. However, as shown in FIG. 10 and FIG. 11, the end portions of the projecting ridge 20a, 20b in the direction X in which the lateral groove 13 extends may be positioned at the edge portions of the land portion 14 respectively.

Modification 4

Figure 12:
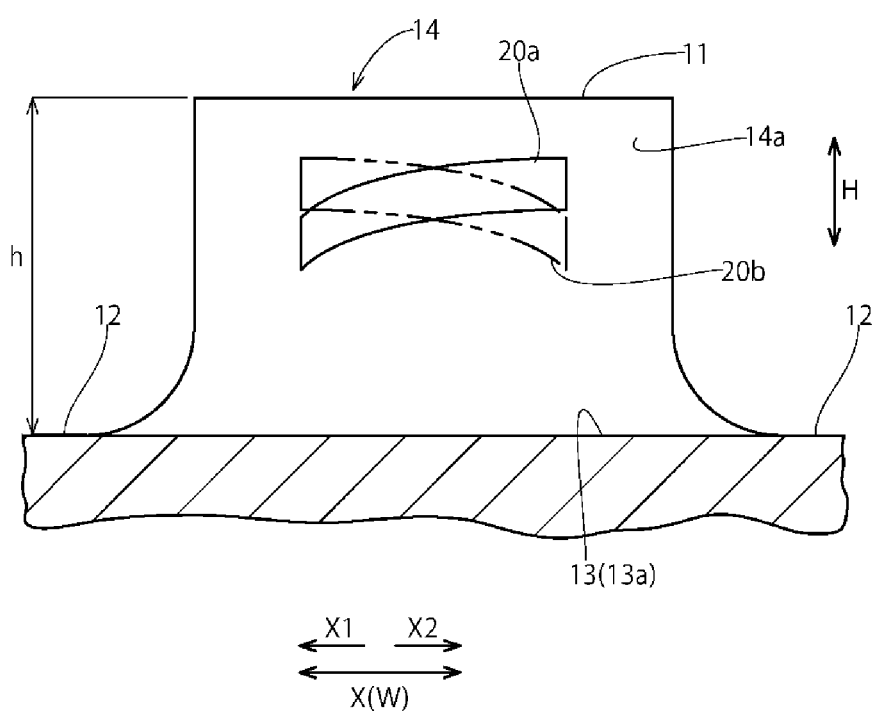
FIG. 12 is a cross-sectional view of a land portion according to a modification 4 of the invention.
Figure 13:
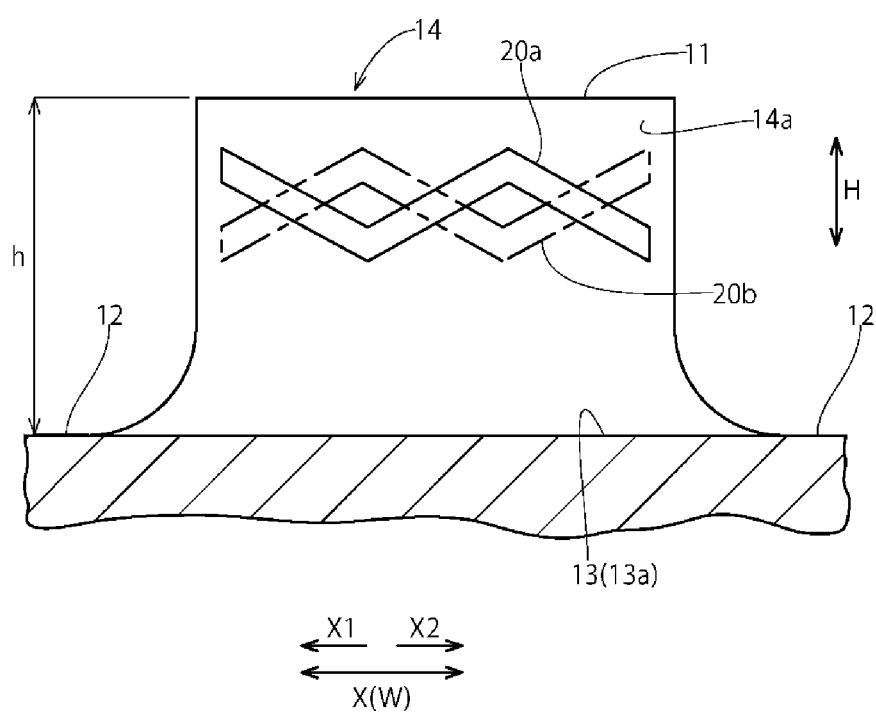
FIG. 13 is a cross-sectional view of the land portion according to the modification 4 of the invention.

In the above-mentioned embodiment, as shown in FIG. 3, the projecting ridges 20a, 20b is formed into a straight line shape as viewed in the width direction Y of the lateral groove 13 where the inclination direction of the projecting ridge 20a, 20b with respect to the direction X in which the lateral groove extends is fixed and does not change. However, the projecting ridges 20a, 20b may be formed into a bent shape where the inclination direction of the projecting ridge 20a, 20b changes with respect to the direction X in which the lateral groove 13 extends as shown in FIG. 12 or into a zigzag shape where an inclination direction changes as shown in FIG. 13.

Modification 5

Figure 14:
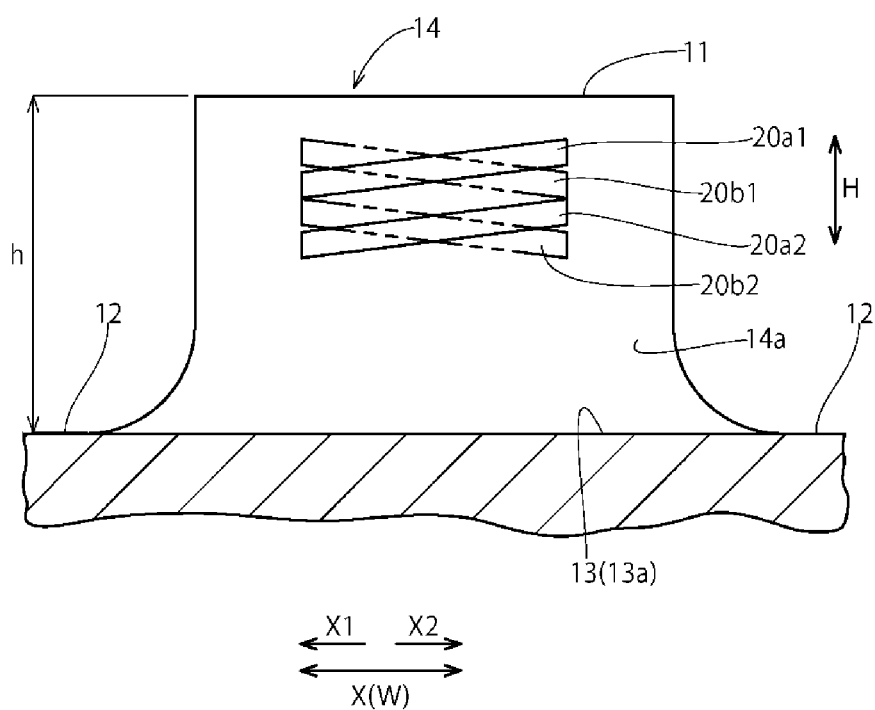
FIG. 14 is a cross-sectional view of a land portion according to a modification 5 of the invention.
Figure 15:
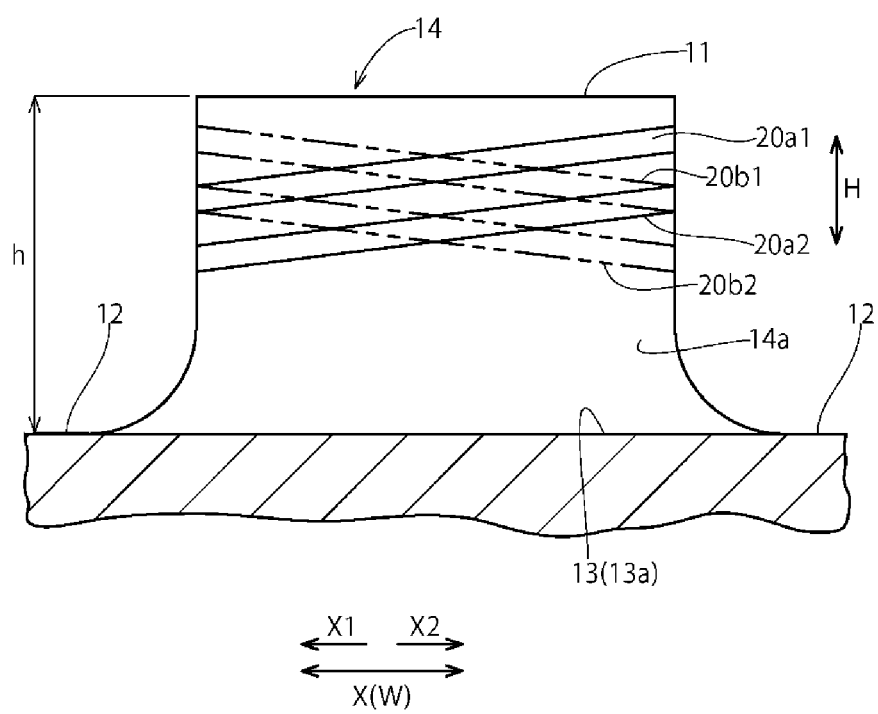
FIG. 15 is a cross-sectional view of the land portion according to the modification 5 of the invention.
Figure 16:
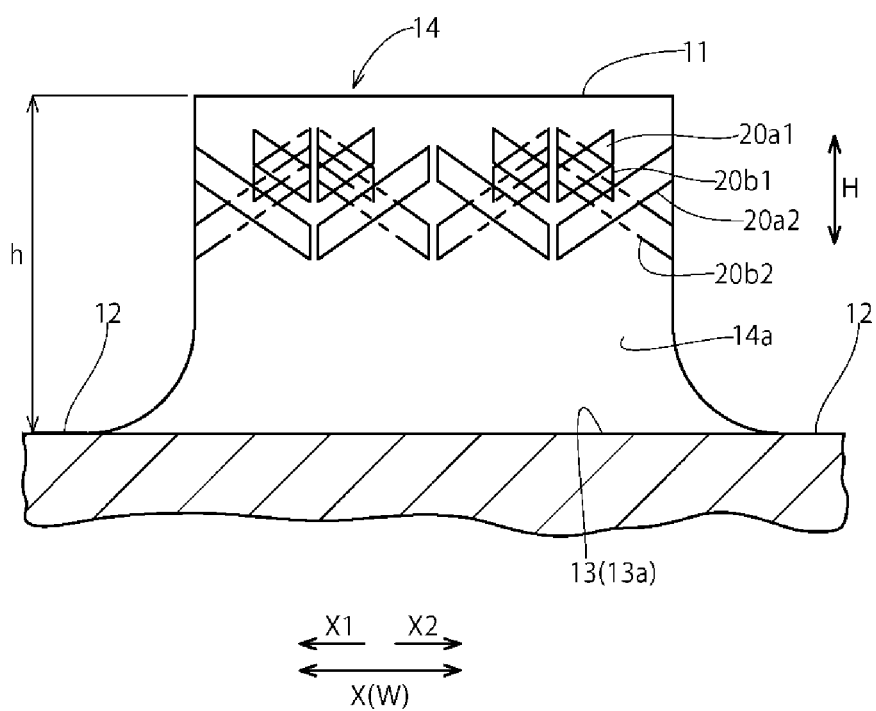
FIG. 16 is a cross-sectional view of the land portion according to the modification 5 of the invention.

In the above-mentioned embodiment, as shown in FIG. 2 to FIG. 5, the projecting ridges 20a, 20b are formed on the pair of side walls 14a, 14b which faces each other in an opposed manner with the lateral groove 13 sandwiched therebetween on a one-to-one basis. However, as shown in FIG. 14 to FIG. 16, a plurality of projecting ridges 20a1, 20a2, 20b1, 20b2 may be formed on each one of side walls 14a at intervals in the groove depth direction H of the lateral groove 13.

Modification 6

Figure 17:
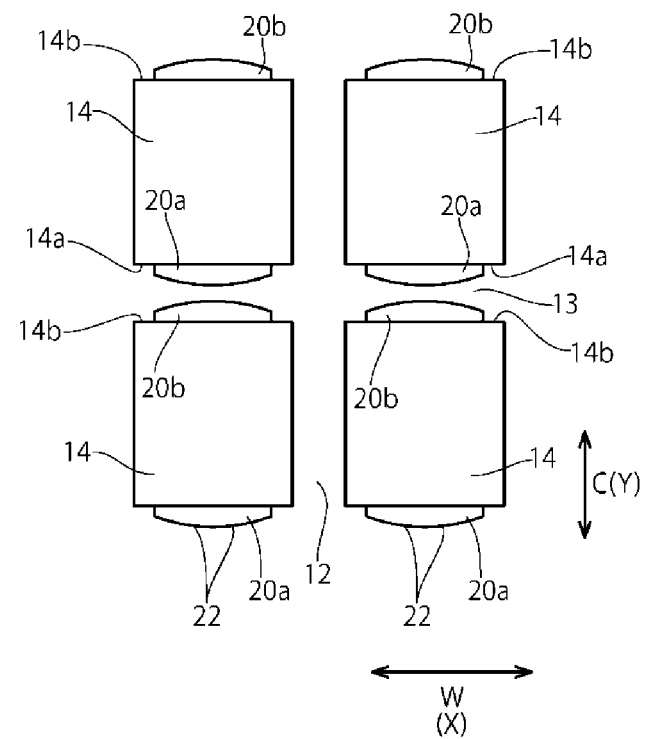
FIG. 17 is a plan view of a land portion according to a modification 6 of the invention.
Figure 18:
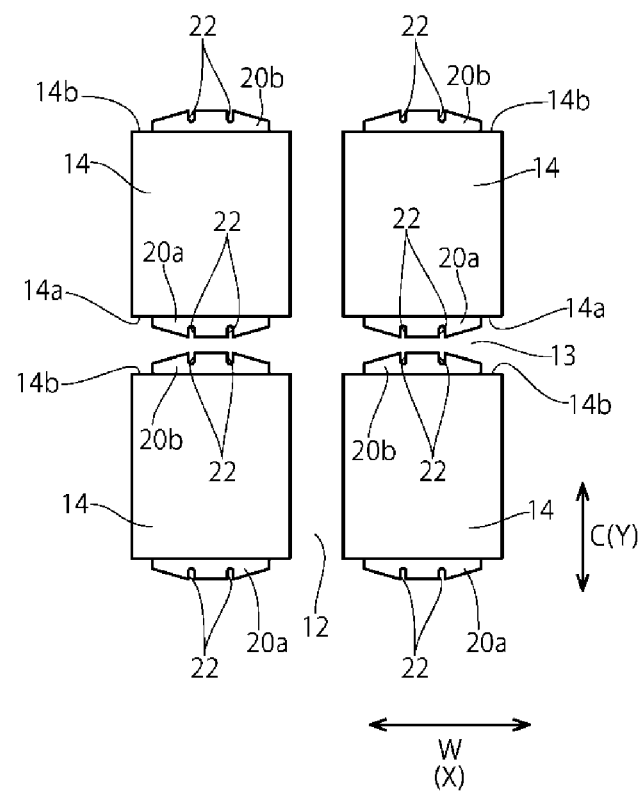
FIG. 18 is a plan view of the land portion according to the modification 6 of the invention.

In the above-mentioned embodiment, as shown in FIG. 1 and FIG. 2, the projecting ridges 20a, 20b are formed such that a projecting amount from the side wall 14a, 14b is fixed in the direction X in which the lateral groove 13 extends. However, as shown in FIG. 17, the projecting ridges 20a, 20b may be formed such that a projecting amount from the side wall 14a, 14b is greater at a center portion of the land portion 14 in the direction X in which the lateral groove 13 extends, and a projecting amount is gradually decreased toward both end portions of the projecting ridge in the direction X in which the lateral groove 13 extends. Further, as shown in FIG. 18, cutout portions 22 which are recessed toward the side wall 14a, 14b may be formed on the projecting ridge 20a, 20b.

Modification 7

In the above-mentioned embodiment, in all land portions 14, the projecting ridges 20a, 20b are formed on the side walls 14a, 14b which face each other in an opposed manner with the lateral groove 13 sandwiched therebetween. However, the projecting ridges 20a, 20b may be formed on only some land portions 14 out of the plurality of land portions 14. For example, the projecting ridge 20 may be formed on the land portions 14 positioned at the center portion in the tire width direction W.

Modification 8

Figure 19:
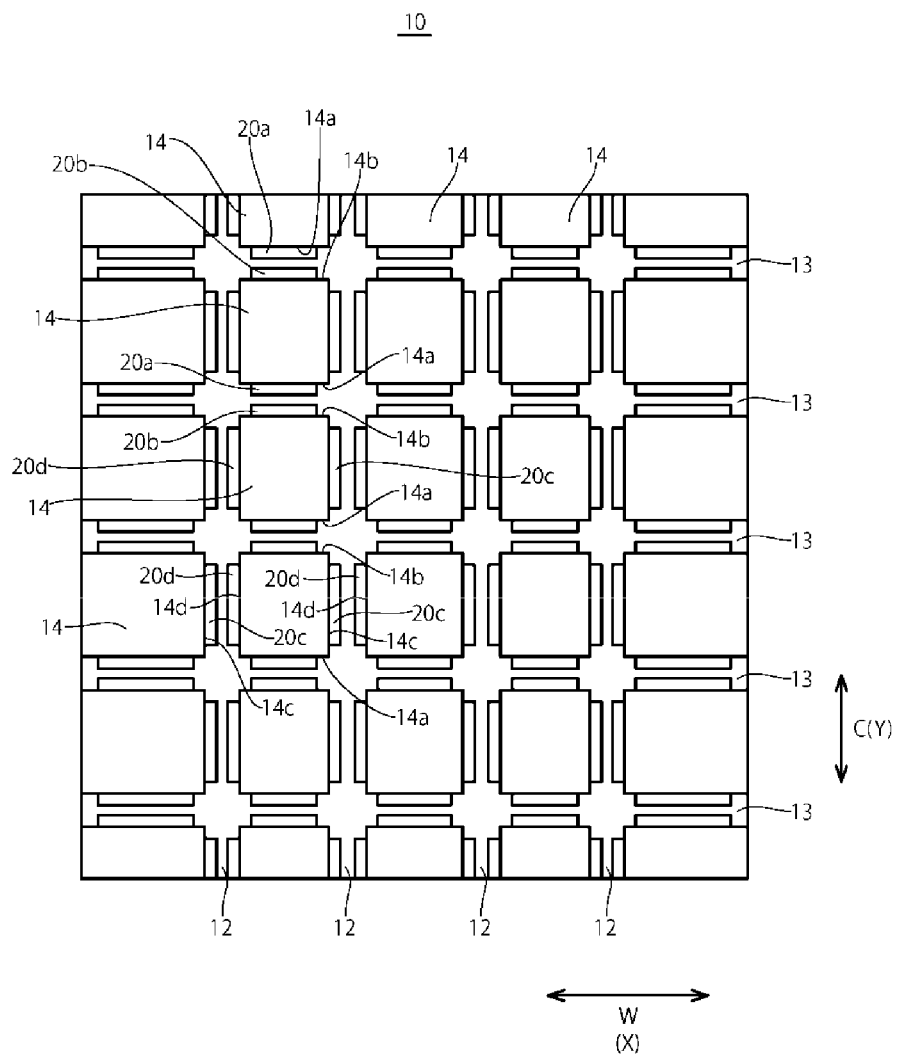
FIG. 19 is a plan view showing a tread pattern of a pneumatic tire according to a modification 8 of the invention.
Figure 20:
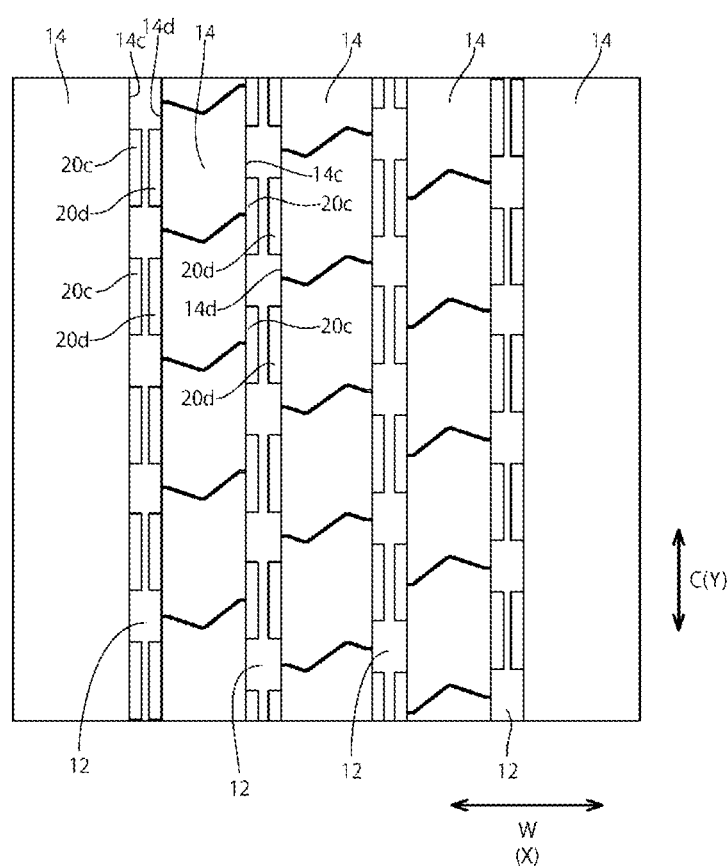
FIG. 20 is a plan view showing the tread pattern of the pneumatic tire according to the modification 8 of the invention.

In the above-mentioned embodiment, the projecting ridges 20a, 20b are formed on the side walls 14a, 14b which face each other in an opposed manner with the lateral groove 13 sandwiched therebetween respectively. However, as shown in FIG. 19, in addition to the side walls 14a, 14b which face each other in an opposed manner with the lateral groove 13 sandwiched therebetween, projecting ridges 20c, 20d may be also formed on side walls 14c, 14d which face each other in an opposed manner with the circumferential groove 12 sandwiched therebetween such that the projecting ridges 20c, 20d are arranged in an inclined manner such that a position of the projecting ridge 20c, 20d in the groove depth direction H changes along the circumferential groove 12 and intersect with each other as viewed in the width direction of the circumferential groove 12 (in this modification, in the direction equal to the tire width direction W and the direction X in which a lateral groove 13 extends). Alternatively, the projecting ridges 20c, 20d may be formed only on side walls 14c, 14d which face each other in an opposed manner with the circumferential groove 12 sandwiched therebetween such that the projecting ridges 20c, 20d are arranged in an inclined manner such that a position of the projecting ridge 20c, 20d in the groove depth direction H changes along the circumferential groove 12 and intersect with each other as viewed in the width direction Z of the circumferential groove 12. In this case, land portions 14 on which the projecting ridges 20c, 20d are formed may be block-shaped land portions 14 which are divided by lateral grooves 13 in the tire circumferential direction C as in the case of the above-mentioned embodiment or may be rib-shaped land portions 14 which are continuous in the tire circumferential direction C.

Other Embodiments

The above-mentioned embodiments and modifications have been proposed as examples, and are not intended to restrict the scope of the invention. These novel embodiments and modifications can be carried out in other various modes, and various omissions, replacements and changes can be made without departing from the gist of the invention.

EXAMPLES

Hereinafter, the invention is explained more specifically with reference to examples. It must be noted here, however, that the invention is not limited to such examples.

Pneumatic tires according to the example and comparison examples 1 to 3 (tire size: 11R22.5 16P. R.) were manufactured as specimen tires. These specimen tires were manufactured under a condition that these specimen tires have the same tire internal structure and the same basic tread pattern, while these specimen tires differ from each other in the projecting ridges 20a, 20b formed on the side walls 14a, 14b of the land portions 14 respectively.

To be more specific, the example correspond to the above-mentioned embodiments. That is, the projecting ridges 20a, 20b are formed on the side walls 14a, 14b which face each other in an opposed manner with the lateral groove 13 sandwiched therebetween respectively such that the projecting ridges 20a, 20b are arranged in an inclined manner such that a position of the projecting ridge in the groove depth direction H changes along the lateral groove 13, and the projecting ridges 20a, 20b intersect with each other as viewed in the width direction Y of the lateral groove 13. The comparison example 1 is an example where no projecting ridge is formed on the side wall of the land portion 14. The comparison example 2 is an example where a projecting ridge is formed only on one side wall 14a out of the side walls 14a, 14b which face each other in an opposed manner with the lateral groove 13 sandwiched therebetween. The comparison example 3 is an example where projecting ridges are formed on the side walls 14a, 14b which face each other in an opposed manner with the lateral groove 13 sandwiched therebetween in a state where the projection ridges are arranged parallel to the groove bottom 13a. A groove width of the lateral groove 13 was set to 10 mm, and a projecting amount of the projecting ridge from the side walls 14a, 14b in the example and the comparison examples 2, 3 was set to 4 mm.

The wear resistant performance was evaluated with respect to the respective pneumatic tires according to the example and the comparison examples 1 to 3. The evaluation method was as follows.

(Wear Resistant Performance)

The respective pneumatic tires according to the example and the comparison examples 1 to 3 were assembled to rims having a size of 22.5×7.50 respectively, air was filled in the tires until an inner pressure became 700 Kpa, and the tires were mounted on an axle of a large truck having a total vehicle weight of 20 t and, thereafter, an amount of step wear between a step-in side of the land portion and a kick-out side of the land portion was measured under a load condition of 80% of maximum loading capacity after the truck traveled 10000 Km and 40000 Km on a pavement road.

TABLE 1

|  | COMPARISON EXAMPLE 1 | COMPARISON EXAMPLE 2 | COMPARISON EXAMPLE 3 | EXAMPLE |
|---|---|---|---|---|
| TRAVELED 10000 Km | 1.6 mm | 1.2 mm | 0.9 mm | 0.4 mm |
| TRAVELED 40000 Km | 2.9 mm | 2.1 mm | 1.7 mm | 0.7 mm |

The result of the evaluation is shown in Table 1. The tire of the example could suppress uneven wear of the land portion compared to the tires of the comparison examples 1 to 3.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A pneumatic tire comprising:
a tread portion;
grooves formed on the tread portion; and
land portions defined by the grooves,
wherein each of the land portions includes: a pair of side walls which opposedly face each other with a lateral groove sandwiched therebetween; a first projecting ridge formed on one of the pair of side walls; and a second projecting ridge formed on the other side wall,
the first projecting ridge and the second projecting ridge extend along the groove,
at least one of the first projecting ridge and the second projecting ridge is inclined such that a position of the projecting ridge in a groove depth direction changes along the groove, and the first projecting ridge intersects with the second projecting ridge as viewed in a width direction of the groove;
wherein an end portion of the first projecting ridge and an end portion of the second projecting ridge, which approach a bottom of the lateral groove, are arranged on a ground contact surface side of a position which corresponds to a depth of 40% of the lateral groove measured from the bottom of the lateral groove; and
wherein the end portion of the first projecting ridge and the end portion of the second projecting ridge, which approach the ground contact surface of the tread portion, are arranged on the groove bottom side of a position which corresponds to a depth of 90% of the lateral groove measured from the bottom of the lateral groove.

2. The pneumatic tire according to claim 1, wherein the second projecting ridge is inclined in a reverse direction of an inclination direction of the first projecting ridge.

3. The pneumatic tire according to claim 2, wherein the grooves include: main grooves extending in a tire circumferential direction; and lateral grooves arranged at intervals in the tire circumferential direction, and the land portion is a block defined by the main grooves and the lateral grooves.

4. The pneumatic tire according to claim 2, wherein at least one of the first projecting ridge and the second projecting ridge is formed in plurality at intervals in the groove depth direction.

5. The pneumatic tire according to claim 1, wherein the grooves include: main grooves extending in a tire circumferential direction; and lateral grooves arranged at intervals in the tire circumferential direction, and the land portion is a block defined by the main grooves and the lateral grooves.

6. The pneumatic tire according to claim 5, wherein at least one of the first projecting ridge and the second projecting ridge is formed in plurality at intervals in the groove depth direction.

7. The pneumatic tire according to claim 1, wherein at least one of the first projecting ridge and the second projecting ridge is formed in plurality at intervals in the groove depth direction.

* * * * *